United States Patent [19]

Kim

[11] Patent Number: 5,563,856
[45] Date of Patent: Oct. 8, 1996

[54] TRACK-CROSSING COUNT CIRCUIT IN AN OPTICAL DISC APPARATUS

[75] Inventor: Gee-bong Kim, Suwon, Rep. of Korea

[73] Assignee: Samsung Electronics Co., Ltd., Kyungki-do, Rep. of Korea

[21] Appl. No.: 496,971

[22] Filed: Jun. 30, 1995

[30] Foreign Application Priority Data

Jun. 30, 1994 [KR] Rep. of Korea .................... 94-15687

[51] Int. Cl.$^6$ .............................. G11B 17/22; G11B 7/00
[52] U.S. Cl. ........................................ 369/32; 369/44.28
[58] Field of Search .................... 369/32, 44.28, 369/44.29, 44.27, 44.34, 44.35, 50, 124; 360/46, 77.02, 78.04, 78.05, 78.09, 78.01

[56] References Cited

U.S. PATENT DOCUMENTS

| | | | |
|---|---|---|---|
| 4,866,687 | 9/1989 | Kasai et al. | 369/32 |
| 5,406,537 | 4/1995 | Lee | 369/32 |
| 5,440,535 | 8/1995 | Takagi et al. | 369/44.28 |

*Primary Examiner*—Tan Dinh
*Attorney, Agent, or Firm*—Sughrue, Mion, Zinn, Macpeak & Seas

[57] ABSTRACT

A track-crossing count circuit in an optical disc device measures the amplitude changes in an RF signal for the high-speed accessing of an optical disc, instead of using a mirror signal. Accordingly, an exact count of the number of track-crossings is facilitated so that the desired position of the track is quickly and accurately detected.

1 Claim, 4 Drawing Sheets

FIG. 4A
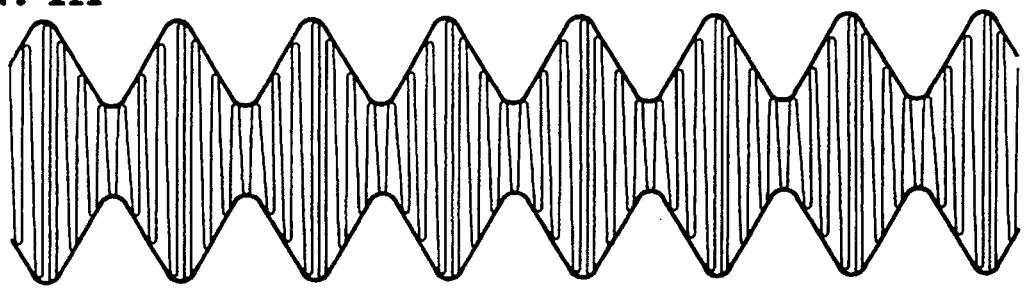
FIG. 4B
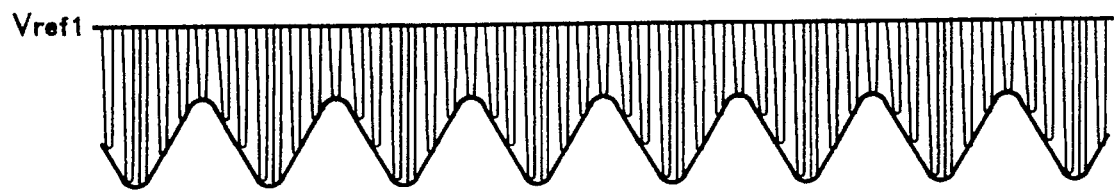
FIG. 4C
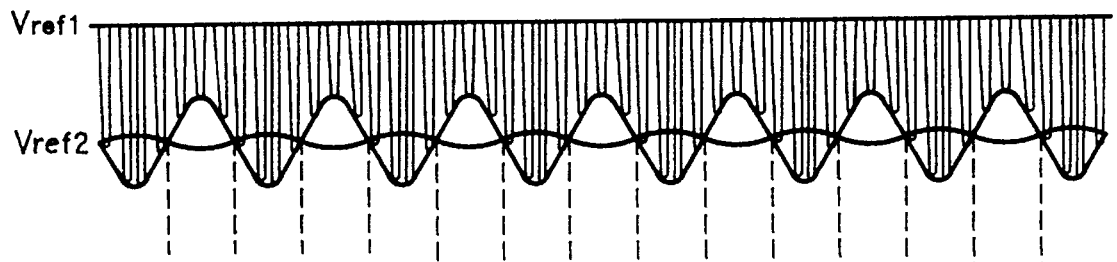
FIG. 4D
FIG. 4E
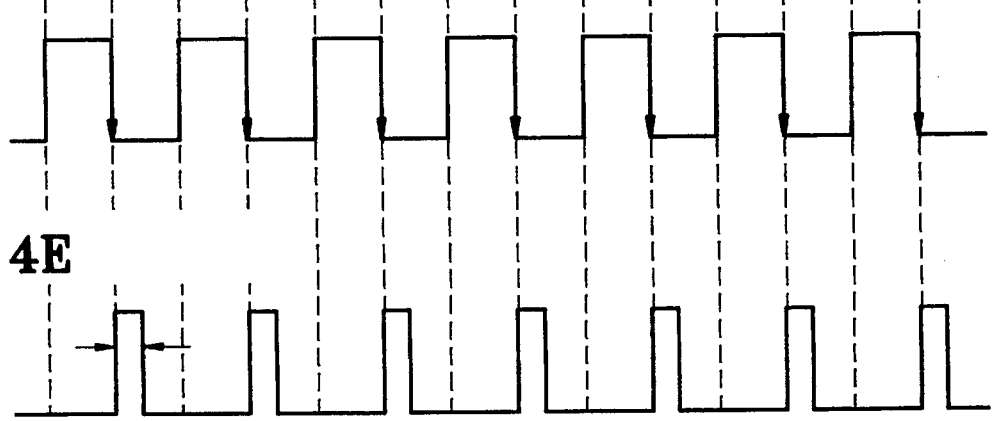

TRACK-CROSSING COUNT CIRCUIT IN AN OPTICAL DISC APPARATUS

BACKGROUND OF THE INVENTION

The present invention relates to a track-crossing count circuit in an optical disc apparatus, and more particularly, to a track-crossing count circuit for accurately counting the number of track-crossings during data search operations on a disc rotating at high speed.

FIG. 1 shows a conventional track-crossing count circuit for use in an optical disc apparatus.

Referring to FIG. 1, a signal read by a pickup 2 which moves across a disc 1 is input into a radio frequency (RF) amplifier 3 which provides a mirror signal output to an inverter 4. At the same time, an error detector 5 detects the errors of the mirror signal output. A rectangular waveform signal is output from a target speed rectangular waveform generator 6 for controlling the speed of a sled motor 10 as a pickup transferring device. An XOR gate 7 performs an exclusive-OR operation on the mirror signal inverted in a inverter 4, and the rectangular waveform signal, and supplies the result to a track counter 8 which counts the number of track-crossings present in the output signal and provides the counted number to a microcomputer 9. In microcomputer 9, a preset count value is compared with the actual count value in track counter 8. Then, pickup 2 is moved in accordance with the control of sled motor 10 until the set count value coincides with the actual count value. Once the two values coincide with each other, the data on disc 1 is read at the location of pickup 2.

Here, due to the frequency characteristics of the circuit, an AC component decreases in amplitude as the pickup speed increases. Accordingly, when the conventional pickup is moved across the disc at speeds higher than a particular level, the bandwidth of the mirror signal is too broad, so that a track counter 8 cannot accurately count the mirror signal pulses. Even with the mirror signals compensated, the pickup transferring device (i.e., sled motor) is non-linear, such that the target speed rectangular waveform generator still generates errors, which prevents accurate high-speed accessing.

SUMMARY OF THE INVENTION

Accordingly, it is an object of the present invention to provide a track-crossing count circuit in an optical disc apparatus, for quickly and accurately searching data on an optical disc, by accurately counting the number of track-crossings during data starch operations on a disc rotating at high speed.

To accomplish the above object of the present invention, there is provided a track-crossing count circuit in an optical disc device, comprising: an RF amplifier for receiving a signal read by a pickup moving across a disc and outputting an amplified RF signal; an amplifier for receiving the output from the RF amplifier and outputting an amplified signal for driving the next stage; a comparator for receiving the output from the amplifier, generating a predetermined reference signal and comparing its amplitude with the received output signal, and outputting a digital signal corresponding to the comparison result; a rectangular waveform generator for receiving the output from the comparator and outputting a rectangular waveform signal having a pulse width in accordance with the output from the comparator; and a track counter for counting the number of tracks crossed by the pickup, according to the output from the rectangular waveform generator.

BRIEF DESCRIPTION OF THE DRAWINGS

The above objects and advantages of the present invention will become more apparent by describing in detail a preferred embodiment thereof with reference to the attached drawings in which:

FIGS. 4A–4E are waveform diagrams for illustrating the operation of various parts of the circuit shown in FIG. 3, and corresponding to nodes thereof.

DETAILED DESCRIPTION OF THE INVENTION

Figure 1:
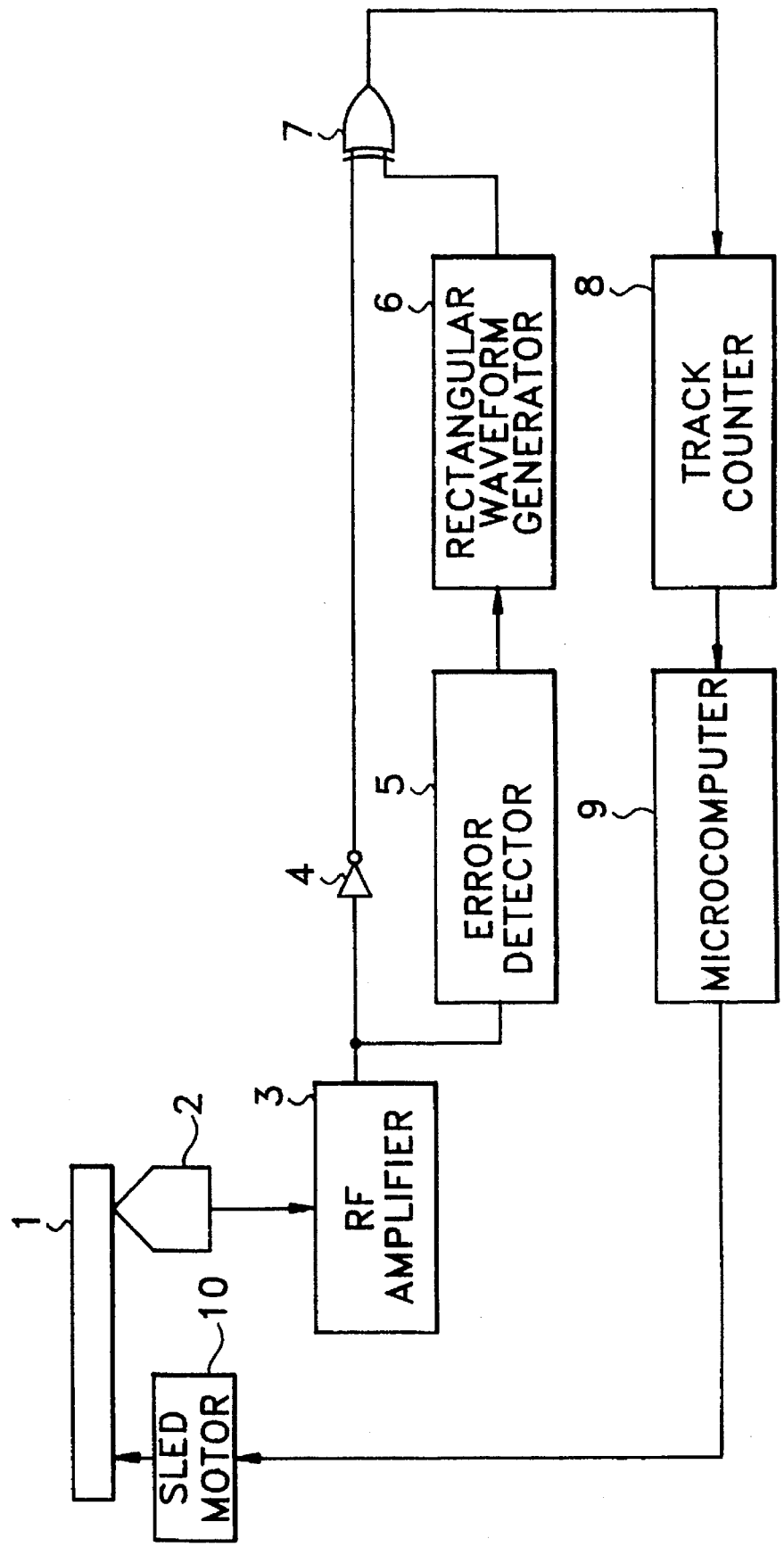
FIG. 1 is a structural block diagram showing a conventional track-crossing count circuit in an optical disc apparatus.
Figure 2:
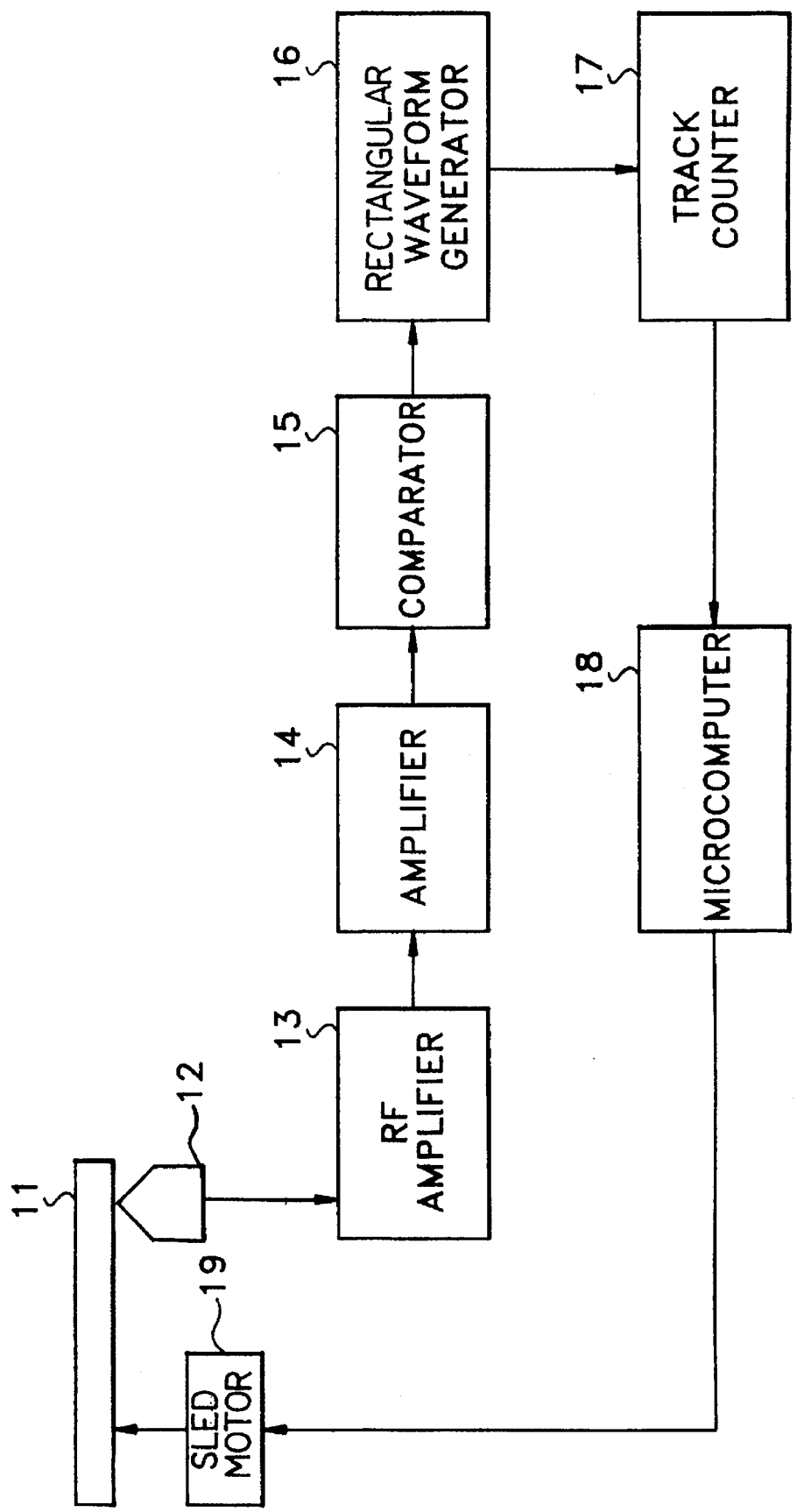
FIG. 2 is a structural block diagram showing a track-crossing count circuit in an optical disc apparatus, according to the present invention.

FIG. 2 is a structural block diagram showing a track-crossing count circuit in an optical disc apparatus, according to the present invention.

The structure of a block diagram shown in FIG. 2 consists of an RF amplifier 13 for reading and inputting the harmonic signals, which corresponds to a periodic structure of pits on the surface of an optical disc 11, by a pickup 12 which moves across the tracks on a disc which is rotating and outputting amplified RF signals; an amplifier 14 for receiving the weak RF signal output from RF amplifier 13 and outputting an amplified signal for driving the next stage; a comparator 15 for receiving the output from amplifier 14, generating a predetermined reference signal for the measurement of amplitude changes in the RF signal, comparing the input amplitude with a predetermined reference signal, and outputting a digital signal corresponding to the original RF signal in order to accurately count signals generated when a laser beam spot crosses a track; a rectangular waveform generator 16 for generating a rectangular waveform signal having a particular pulse width according to the output from comparator 15, a track counter 17 for receiving the output from rectangular waveform generator 16 and counting the number of tracks crossed when a pickup 12 moves across optical disc 11; and a microcomputer 18 for receiving the count value of track counter 17, comparing the actually counted value with a preset count value (in the microcomputer), and controlling a sled motor 19.

Figure 3:
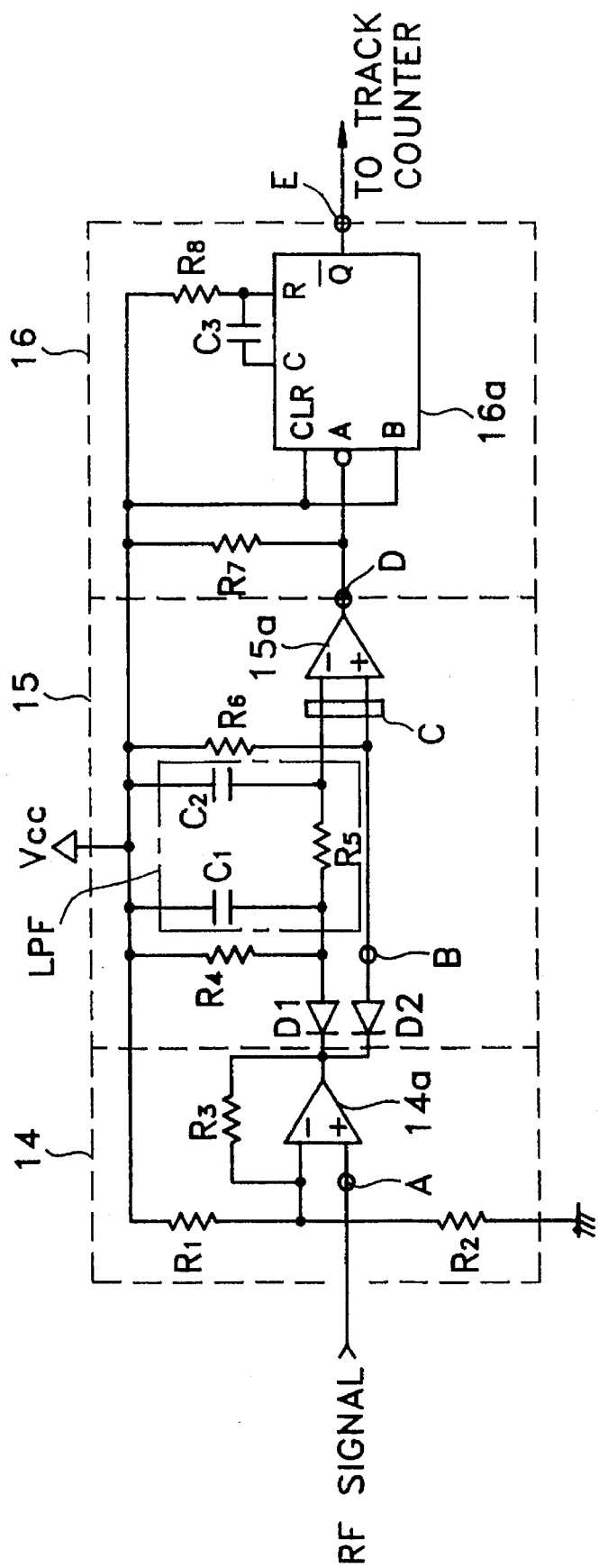
FIG. 3 is a circuit diagram showing an embodiment of the track-crossing count circuit in an optical disc apparatus shown in FIG. 2.

FIG. 3 is a circuit diagram according to an embodiment of the track-crossing count circuit shown in FIG. 2, using the same reference numerals as in FIG. 2.

FIGS. 4A–4E are waveform diagrams for illustrating the operation of various parts of the circuit shown in FIG. 3. FIG. 4A shows the RF signal output from RF amplifier 13 and corresponds to a node "A" in FIG. 3; FIG. 4B shows the waveform having passed through a diode rectifier, after the output from RF amplifier 13 is amplified by amplifier 14, and corresponds to node "B"; FIG. 4C shows the input waveform to comparator 15 and reference signal $V_{ref2}$, and corresponds to node "C"; FIG. 4D shows the digital output from comparator,15 and a reference signal $V_{ref2}$ for measuring of amplitude changes in the RF signal and comparing with the amplitude of the two signals, and corresponds to node "D"; and FIG. 4E shows the output from a monostable multivibrator 16a for generating a pulse width according to the output from comparator 15, and corresponds to node "E" in FIG. 3.

The operation of the above track-crossing count circuit according to the present invention will now be described with reference to FIGS. 3 and 4.

In amplifier 14, operational amplifier 14a is a non-inverting amplifier, with the RF signal output from RF amplifier 13 being input to the non-inverting input of an operational amplifier 14a, so as to be amplified for input to the next stage. Here, the common node of biasing resistors R1 and R2 is connected to the inverting input of operational amplifier 14a, for determining reference voltage $V_{ref1}$. A resistor R3 provides a negative-feedback path.

In comparator 15, the cathodes of parallel diodes D1 and D2 are commonly connected to the output of operational amplifier 14a. The non-inverting input of an operational amplifier 15a is directly connected with the anode of diode D2, while its inverting input is connected via a low-pass filter (LPF) consisting of capacitors C1 and C2 and a resistor R5, to the anode of diode D1. Bias resistors R4 and R6 are provided for operating diodes D1 and D2, respectively.

As the output from amplifier 14 passes through diodes D1 and D2, the signal is rectified so that only the portion of the signal below reference voltage $V_{ref1}$ is passed. The signal passing through diode D2 is input to the non-inverting input of operational amplifier 15a, while the AC component passing through diode D1 is blocked by the low-pass filter, to thereby generate a predetermined reference signal $V_{ref2}$ for measuring of amplitude changes in the RF signal input to the non-inverting input of operational amplifier 15a. Therefore, comparator 15 compares the amplitude of the input RF signal with reference signal $V_{ref2}$ and outputs a digital signal in correspondence with the result, thus facilitating the exact count of the pulses generated when a laser beam spot crosses over a track.

Rectangular waveform generator 16 outputs a rectangular waveform signal having a predetermined width according to the output from the comparator 15. The moment the output from comparator 15 input to monostable multivibrator 16a is changed from a "high" logic level to a "low" logic level, the output of a rectangular waveform pulse is triggered, the pulse width of which is determined in accordance with a capacitor C3 and a resistor R8.

As described above, in a track-crossing count circuit in an optical disc apparatus according to the present invention, instead of using a mirror signal, the amplitude changes in an RF signal is measured for the high-speed accessing of an optical disc. Thus, an exact count of the number of tracks crossed is facilitated, so that the desired position on the track is quickly and accurately detected.

What is claimed is:

1. A track-crossing count circuit in an optical disc device, comprising:

an RF amplifier for receiving a signal read by a pickup moving across a disc and outputting an amplified RF signal;

an amplifier for receiving the output from said RF amplifier and outputting an amplified signal;

a comparator for receiving the output from said amplifier, generating a predetermined reference signal and comparing its amplitude with the received output signal, and outputting a digital signal corresponding to the comparison result;

a rectangular waveform generator for receiving the output from said comparator and outputting a rectangular waveform signal having a pulse width in accordance with the output from said comparator; and a track counter for counting the number of tracks crossed by said pickup, according to the output from said rectangular waveform generator.

\* \* \* \* \*